· US009933245B2

(12) United States Patent
Jensen

(10) Patent No.: US 9,933,245 B2
(45) Date of Patent: Apr. 3, 2018

(54) INTERFEROMETRIC DISTANCE MEASURING ARRANGEMENT FOR MEASURING SURFACES AND CORRESPONDING METHOD WITH EMISSION OF AT LEAST TWO PARALLEL CHANNELS

(71) Applicant: HEXAGON TECHNOLOGY CENTER GMBH, Heerbrugg (CH)

(72) Inventor: Thomas Jensen, Rorschach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 109 days.

(21) Appl. No.: 14/416,217

(22) PCT Filed: Jul. 18, 2013

(86) PCT No.: PCT/EP2013/065222
§ 371 (c)(1),
(2) Date: Jan. 21, 2015

(87) PCT Pub. No.: WO2014/016200
PCT Pub. Date: Jan. 30, 2014

(65) Prior Publication Data
US 2015/0176969 A1    Jun. 25, 2015

(30) Foreign Application Priority Data

Jul. 24, 2012   (EP) ..................................... 12177582

(51) Int. Cl.
*G01B 9/02* (2006.01)
*G01B 11/00* (2006.01)

(52) U.S. Cl.
CPC ..... *G01B 9/02091* (2013.01); *G01B 9/02004* (2013.01); *G01B 9/0205* (2013.01);
(Continued)

(58) Field of Classification Search
CPC ............ G01B 9/02091; G01B 9/02027; G01B 9/02057; G01B 9/02004; G01B 9/0205;
(Continued)

(56) References Cited

U.S. PATENT DOCUMENTS 4,748,686 A * 5/1988 Glomb .................. G01D 5/268
324/96
5,402,582 A   4/1995 Raab
(Continued)

FOREIGN PATENT DOCUMENTS

DE    43 25 337 A1    2/1994
DE    43 25 347 A1    2/1994
(Continued)

OTHER PUBLICATIONS

RP Photonics, Coherence Length, Aug. 7, 2011, https://web.archive.org/web/20110807155442/https://www.rp-photonics.com/coherence_length.html.*
(Continued)

*Primary Examiner* — Michael P Lapage
(74) *Attorney, Agent, or Firm* — Maschoff Brennan

(57) ABSTRACT

The invention relates to an interferometric distance measuring arrangement for measuring surfaces, with at least one laser source, which can be tuned, with a coherence length for generating measurement radiation modulated by a wave length ramp, an optical beam path with an optical transmitting system for emitting the measurement radiation to the surface and an optical capturing system for capturing the measurement radiation back-scattered by the surface, comprising a measuring arm and a reference arm and a radiation detector and an evaluation unit for determining the distance from a reference point of the distance measuring device to the surface. Channels are defined by at least one beamsplitter n≥2 for the parallel emission of measurement radiation,
(Continued)

respectively one different sub area of the measurement range defined by the coherence length is allocated to the channels.

20 Claims, 7 Drawing Sheets

(52) U.S. Cl.
CPC ..... G01B 9/02027 (2013.01); G01B 9/02057 (2013.01); G01B 11/007 (2013.01)

(58) Field of Classification Search
CPC ..... G01B 11/077; A61B 3/102; A61B 5/0066; A61B 5/0073
See application file for complete search history.

(56) References Cited

U.S. PATENT DOCUMENTS

| | | | |
|---|---|---|---|
| 6,198,540 B1 | 3/2001 | Ueda et al. | |
| 6,341,036 B1 | 1/2002 | Tearney et al. | |
| 6,724,485 B1 | 4/2004 | Drabarek | |
| 7,576,864 B2 | 8/2009 | Lindner et al. | |
| 9,677,870 B2 | 6/2017 | Jensen | |
| 2005/0018200 A1* | 1/2005 | Guillermo | G01N 21/4795 356/479 |
| 2005/0054937 A1* | 3/2005 | Takaoka | A61B 5/0084 600/476 |
| 2007/0278389 A1* | 12/2007 | Ajgaonkar | G01B 9/02028 250/221 |
| 2010/0312524 A1 | 12/2010 | Siercks et al. | |
| 2012/0232821 A1* | 9/2012 | Liu | G01L 3/101 702/77 |
| 2013/0003077 A1* | 1/2013 | Suehira | A61B 3/102 356/479 |
| 2013/0239384 A1* | 9/2013 | Pie | B05B 7/0018 29/426.1 |
| 2014/0078510 A1* | 3/2014 | Rubio Guivernau | G01B 9/02091 356/479 |

FOREIGN PATENT DOCUMENTS

| | | |
|---|---|---|
| DE | 198 08 273 A1 | 9/1999 |
| EP | 1 474 650 B1 | 11/2004 |
| EP | 2541193 A1 | 1/2013 |
| WO | 02/056075 A1 | 7/2002 |
| WO | 2009/036861 A1 | 3/2009 |

OTHER PUBLICATIONS

European Search Report dated Nov. 9, 2012 as received in Application No. 12 17 7582.
Alfano et al., "Free-space supercontinuum coherence data packets multiplexing and demultiplexing for ultrafast laser communication", IEEE Journal of Selected Topics in Quantum Electronics, vol. 10, Issue 5, Sep.-Oct. 2004, pp. 1233-1237.
T. Klein et al., "Megahertz OCT for ultrawide-field retinal imaging with a 1050 nm Fourier domain mode-locked laser", Opt. Express 19, 3044-3062 (2011).
Y.K. Tao et al., "High-speed complex conjugate resolved retinal spectral domain optical coherence tomography using sinusoidal phase modulation", Opt. 25 Lett. 32, 2918 (2007).
"Three-dimensional sensing of rough surfaces by coherence radar", Appl. Opt. 31, 919 (1992).
"Line-field optical coherence tomography using frequency-sweeping source", IEEE J. Selec. Top. Quant. Electr. 14, 50 (2008).
J. Sun et al., MEMS-based endoscopic OCT, International Journal of Optics, vol. 2011, Jan. 2011.

* cited by examiner

INTERFEROMETRIC DISTANCE MEASURING ARRANGEMENT FOR MEASURING SURFACES AND CORRESPONDING METHOD WITH EMISSION OF AT LEAST TWO PARALLEL CHANNELS

FIELD OF THE INVENTION

The invention relates to an interferometric distance measuring arrangement for measuring surfaces, and to a corresponding method.

BACKGROUND

In many areas of application there is a need to measure surfaces of objects and thus the objects themselves with high accuracy. This applies to the manufacturing industry, in particular, for which high importance is attached to measuring and checking surfaces of workpieces. For these applications there are a number of measuring apparatuses which are designed for specific tasks and are also designated as coordinate measuring apparatuses or machines. These measuring apparatuses measure the surface by establishing a mechanical contact and scanning the surface. Examples thereof include gantry measuring machines, as described, e.g., in DE 43 25 337 or DE 43 25 347. A different system is based on the use of an articulated arm whose measuring sensor arranged at the end of the multipartite arm can be moved along the surface. Generic articulated arms are described for example in U.S. Pat. No. 5,402,582 or EP 1 474 650. Other methods use optical measurement radiation in order to be able to scan surfaces without contact.

One approach known from the prior art is based here on interferometric methods, such as, for example, optical coherence tomography (OCT), such as are described for example in WO 2009/036861 or the European patent application having the application number 11171582.7. The distance measuring methods disclosed therein use, for the purpose of measuring surfaces, a frequency-modulated laser beam for providing measurement radiation, which is emitted onto the surface. The measurement radiation backscattered from the surface is received again and serves for interferometrically measuring the distance from a reference point to the surface, i.e. in the so-called z-direction, wherein a measurement arm and a reference arm are used.

In most exemplary embodiments, the surface is scanned by means of a single measurement channel that measures the distance to a point on the surface, wherein the surface is implemented by the entire probe head being moved over the path of measurement points on the surface. For a multiplicity of applications there is a need, however, to scan a relatively large number of points in a distance-measuring fashion simultaneously or in rapid succession, without this necessitating moving the probe head with the optical system in order over each point to be measured.

One approach known from the prior art consists in using one- or two-dimensionally scanning mirrors in order to be able to move the measurement beam over the surface, without this necessitating a movement of the probe head or the entire measuring arrangement. Corresponding realizations with micromechanical elements for interferometric measuring arrangements in the medical field are described for example in J. Sun et al., "MEMS-based endoscopic OCT", Int. J. of Opt., 2011. The disadvantage of these mirror-based solutions, however, is the still sequential scanning of spatially extensive objects, which reduces the speed that can be realized. An increase is possible only by means of increased scanning rates or by means of the parallelization of the measuring process orthogonally by the use of a plurality of channels.

Therefore, WO 2009/036861 describes probe heads in which the beam path of the measurement radiation is split into two channels, the emission and reception directions of which are oriented with respect to one another, and probe heads in which a plurality of spatially parallel channels are realized. In these approaches, the measurement channels can be used temporarily in parallel or sequentially, wherein either two or more separate measuring arrangements or alternatively a single measuring arrangement with a separation of the channels, e.g. by means of different polarization directions, are or is possible in the case of simultaneous use. Such an embodiment of the probe head allows measurement of edges or steps, for example. However, as a result of the polarization-dependent separation, the construction is complicated and the number of channels that can be realized is limited.

With regard to the underlying measurement principle, for optical coherence tomography very rapidly tunable sources are known, as described e.g. in T. Klein et al., "Megahertz OCT for ultrawide-field retinal imaging with a 1050 nm Fourier domain mode-locked laser", Opt. Express 19, 3044-3062 (2011), and very fast approaches exhibiting spectral resolution in the Fourier domain with high-speed line CCDs are also known, as described e.g. in Y. K. Tao et al., "High-speed complex conjugate resolved retinal spectral domain optical coherence tomography using sinusoidal phase modulation", Opt. Lett. 32, 2918 (2007).

However, both methods exhibit a deficiency of available coherence length, such as is required in the field of industrial metrology, e.g. for use in generic coordinate measuring machines or apparatuses.

For methods of optical coherence tomography in the time domain (time domain OCT) with broadband sources, this would require, on account of the short coherence length, additional scanning in the z-direction, i.e. in the surface normal of the surface to be measured, which in turn necessitates additional drives and increased complexity, cf. T. Dresel et al., "Three-dimensional sensing of rough surfaces by coherence radar", Appl. Opt. 31, 919 (1992).

Methods of optical coherence tomography in the frequency domain (frequency domain OCT), i.e. with spectral resolution, could be developed further in terms of their capability for parallel scanning by the use of an area sensor instead of a line sensor. However, the low frame rates or read-out speeds and the likewise low typical coherence lengths of the order of magnitude of a few millimeters are disadvantageous here.

In this case, the approach of frequency-modulated OCT can also be enhanced into the two- or three-dimensional scanning range by the use of line or area sensors. Since, on account of the required scanning of the interferogram with hundreds of data points, in this case a complete measurement also necessitates a corresponding recording of many hundreds of data fields by means of line or area sensor, such methods are very slow (<100 Hz) in comparison with typical FD-OCT methods, cf. e.g. S. W. Lee et al., "Line-field optical coherence tomography using frequency-sweeping source", IEEE J. Selec. Top. Quant. Electr. 14, 50 (2008).

One major shared disadvantage here is also the design used for the probe head in free space optics, the data being generated by line or area sensors. This means that it is no longer possible to spatially divide probe head and signal generation and signal processing with a connection by a monomode fiber. Besides the resultant increased complexity of the probe head and the increased mass thereof, in particular the heating of the probe head brought about by the current consumption has an adverse effect. In the field of coordinate measuring technology it is generally advantageous for the components that are moved over the surface to be fashioned as passively as possible, with the result that thermal influences that deform the carrier structure used for movement cannot arise. Moreover, a low mass of the components to be moved, but in particular of the probe head, leads to an improved dynamic range and to smaller acceleration-dependent deformations of the carrying structure.

SUMMARY

Some embodiments to provide an improved distance measuring arrangement or a corresponding measuring apparatus for measuring surfaces or for detecting surface topographies and a corresponding method Some embodiments provide such an improved distance measuring arrangement and such a method which allows a measurement of a plurality or multiplicity of points without movement of the probe head in conjunction with low complexity of the construction and low thermal loading of the carrying structures.

The invention uses an interferometric measurement principle with a laser source that is modulated with regard to the wavelength, i.e. emits with variable wavelength, wherein the measurements are carried out in the frequency domain. In this case, the laser radiation generated by a laser source, e.g. a laser diode, is modulated by a wavelength ramp being passed through and the optical frequency of the radiation thus being varied. A sinusoidal modulation, for example, is impressed on a central wavelength or optical frequency. The measured interferogram is then evaluated e.g. over half a period of the modulation frequency in which the optical frequency rises or falls monotonically, which is also referred to hereinafter as wavelength ramp. On account of the tunable laser as a very narrowband source, all interference effects lie in the same coherence range.

In this case, the wavelength ramp can be embodied as a traditional ramp, i.e. with a substantially linearly rising or falling sequence of wavelengths to be passed through. Alternatively, however, the set of different wavelengths can also be modulated randomly, i.e. in a manner deviating from the linearly ordered sequence, as long as only the set of wavelengths is detected and modulated once during an excursion of the ramp. The term wavelength ramp therefore encompasses in the broader sense a set of different wavelengths which can indeed be brought into an ascending or descending succession, but are not necessarily passed through and modulated in this succession. However, one preferred embodiment is designed with a sequence of alternately rising and falling linear ramps.

Methods and components suitable for this are described in WO 2009/036861 or the European patent application having the application number 11171582.7. The invention is based on the fact that at least two optical transmission channels are realized which can also be used for reception, wherein a temporally parallel emission of the measurement radiation takes place. According to the invention, the possible measurement range predefined by the coherence length, i.e. the total measurement depth that can be realized, is split on the distance side as a result, such that the zero position is shifted for each of the channels. Each channel is thus assigned a subrange of the measurement range with its respective measurement depth, and the respective shift of the zero position for a channel is known and can therefore be taken into account in the measurements or the evaluation thereof. The channels thus measure the same distance as the end result despite different zero positions in the case of a smooth surface, for which purpose differently staggered distances are generated before the signal processing by means of delay sections, which distances are known and correspondingly taken into account in the evaluation. To put it another way, the reference points for the measurements are shifted from channel to channel, but can be matched computationally. In order to avoid crosstalk or overlapping of the channels, the optical system should be designed, for example, such that the expedient measurement range is physically limited by a correspondingly high degree of focusing. Moreover, the measurement objects should not have an excessively high degree of variation of the topography and should rather be planar, for example. In the signal processing, the width of the bandpass filters defines the subdivided measurement ranges in accordance with the physical conditions of the measuring optical system. The total measurement range that is maximally to be subdivided is limited by the coherence length. The maximum limit of such staggering of channels is given here by the ratio of total measurement range to still resolvable and usable subdivided measurement ranges, and also the increasing reduction of the optical power in the channels.

The shift of the zero point or of the zero position is realized by means of different delays for the channels, which are brought about by the beam path being guided through a selected medium that deviates from air, with the result that the measurement range defined by the coherence length is split into individual portions and the coherence length is thus subdivided. The Fourier spectrum or tomogram in the case of technical measurements of surfaces that are opaque to the measurement radiation, in particular for metal surfaces, normally exhibits only a single maximum. Consequently, a large part of the space in the frequency domain is not used for the measurement. A parallelization can be achieved by means of the splitting of the entire measurement range available on account of the given coherence length of the source. In this case, the achievable accuracy can be maintained, in principle, but as a result of the splitting the energy is distributed among the different channels, although this can be compensated for by the use of amplifiers.

This displacement of the zero points, which is referred to as frequency division multiplexing, can be realized in a structurally compact embodiment in which the different path lengths in delaying media can be realized by spatially integrable elements such as, e.g. glass elements or optical fibers.

In addition, in order to avoid crosstalk, it is possible to use coherence delay sections whose relative length spacing between successive channels is in each case greater than the coherence length.

The approach can also be combined with chromatic multiplexing, e.g. in order to fashion two-dimensional, in particular matrix-like aperture arrangements. According to the invention, for a given emission instant each of the channels or else a set of channels is then also allocated a subrange of the wavelength ramp to be passed through, i.e. a wavelength and frequency band, which is assigned the radiation emitted at this instant with regard to its wavelengths to be modulated.

In this case, each channel can be allocated a static subrange of the wavelength ramp, i.e. the measurement radiation emitted via other channels is not modulated with this part of the wavelength ramp. In comparison with the wavelength ramp, a modulation is carried out with a smaller excursion, i.e. the wavelength ramp is split into partial ramps and the overall modulation is split into partial modulations. In this case, the wavelength ramp can be split in its entirety along all channels uniformly or else non-uniformly, i.e. with non-uniform wavelength excursion per channel. In principle, however, part of the wavelength ramp can also remain unused or be used for other purposes, e.g. for an internal calibration or reference measurement. A component-side realization of this approach can be implemented for example by a chromatic separation by means of beam splitters, in particular also by a stepped sequence of beam splitters. A separability of the channels thus arises as a result of their spectral limitation brought about by division.

The chromatic multiplexing brought about as a result thus uses the large width (100 to 200 nm) of the wavelength ramp of available sources which is split into subranges. Although this does not influence the usable coherence length, it does reduce the spatial resolution in the extent of the parallelization. On account of the high accuracy (3σ~20-30 nm) of optical coherence tomography in the frequency domain, a reduction of the measurement accuracy for technical surfaces can usually be accepted without any problems. According to the invention, therefore, by means of at least one beam splitter channels for the parallel emission of measurement radiation are defined, which are allocated in each case a different subrange of the wavelength ramp. Each channel has, at its output, a different spectral distribution specifically present, hence a different chromatic characteristic. The combination of chromatic and frequency division multiplexing thus enables, at the receiving end, a separation and assignment of the signals to a plurality of channels.

The approach according to the invention makes it possible to realize an interferometric distance measuring arrangement according to the principle of optical coherence tomography in the frequency domain in which, in the case of parallelization of the measuring process, it becomes possible to implement a separation of probe head and signal processing and the connection thereof via an individual monomode fiber. The probe head to be moved over the surface can thereby be designed in an electronically passive fashion and without the generation of thermal loading. The use of frequency division multiplexing, in particular also in connection with additional chromatic multiplexing, makes it possible to keep the measurement rate for the parallelized measurement with line- or matrix-type arrangement of the channels at the level of the individual-point measurement.

BRIEF DESCRIPTION OF THE DRAWINGS

Distance measuring arrangements according to the invention are described or explained in greater detail purely by way of example below on the basis of exemplary embodiments illustrated schematically in the drawing, in which specifically.

DETAILED DESCRIPTION

Figure 1:
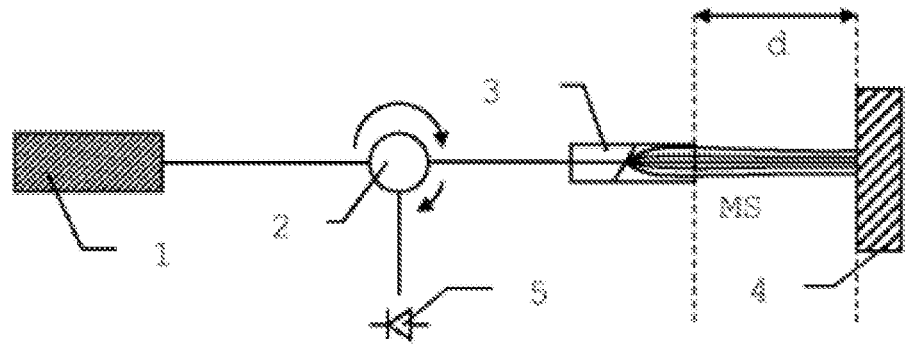
FIG. 1 shows the schematic illustration of the interferometric measuring arrangement in a measuring apparatus from the prior art for measuring surfaces.

FIG. 1 shows the schematic illustration of the interferometric measuring arrangement in a measuring apparatus from the prior art for measuring surfaces, as is described e.g. in WO 2009/036861 A1 or the European patent application having the application number 11171582.7. Such an arrangement uses a wavelength-modulated laser source 1 for generating at least one laser beam and a radiation detector 5 for receiving the measurement radiation MS backscattered from a surface 4. In this case, the modulated laser source is preferably designed such that it has a coherence length of more than 1 mm, in particular in the range of 1 millimeter to 20 centimeters, e.g. a central wavelength of between 1.3 and 1.7 µm and a tunable wavelength range of more than 40 nm in the case of a dynamic line width of less than 0.02 nm in the case of a coherence length of 60 nm or more. The coherence length thus also allows measurements over a depth or distance range of a few centimeters.

The laser radiation generated by the laser source 1 is coupled via an optical circulator 2 into the interferometer construction used for measurement, said interferometer construction being embodied using common path geometry, for example, that is to say having a partly common interferometer beam path for measurement arm and reference arm. In this case, the reference arm is defined by a reflection at the optical exit surface of a gradient-index lens, such that a constant, in particular known, distance is defined, wherein further back reflections are avoided. Therefore, the reference surface lies in a transmitting/receiving optical unit 3 integrating the components of the transmitting and receiving optical unit within the beam shaping optical unit used for emitting the laser beam. By contrast, the measurement arm is defined by the reflection at the surface 4 to be measured. The back reflected light of measurement arm and reference arm is finally passed via the optical circulator 2 again onto the radiation detector 5, which is preferably embodied as an InGaAs detector having a bandwidth of more than 100 MHz. Finally, the distance d to be measured can be determined in an evaluation unit (not illustrated here).

In addition, it is also possible to use a calibration interferometer (not illustrated here) with an optical detector for taking account of or compensating for nonlinearities in the tuning behavior, wherein said calibration interferometer can be embodied in particular in an etalon or Mach-Zehnder configuration.

Figures 2, 3:
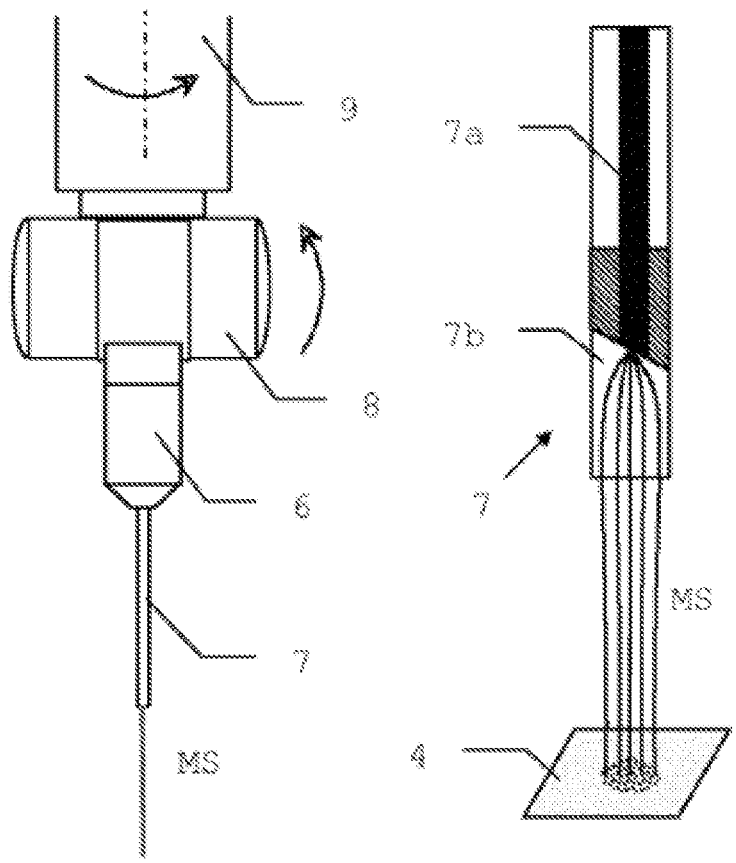
FIG. 2 shows the illustration of the structural construction of a probe head for a corresponding measuring apparatus.
FIG. 3 shows the schematic illustration of transmitting and receiving optical unit for a corresponding measuring apparatus.

Such a distance measuring arrangement can be integrated e.g. into a probe head of a coordinate measuring apparatus for scanning measurement, such as is known e.g. from WO 2009/036861 A1. FIG. 2 illustrates the structural construction of such a probe head for a corresponding measuring apparatus. In this case, the coordinate measuring apparatus has guide means for guiding the probe head in a defined scanning fashion over the surface to be measured, and the probe head has at least one emission and reception beam path for the emission of the measurement radiation MS of the interferometric distance measuring arrangement.

The probe head is guided, in a manner defined by an arm element 9 and a joint 8 as guide means, in a scanning fashion over the surface to be measured, wherein a rotation of the joint 8 relative to the arm element 9 is also possible. By virtue of the rotatability relative to the arm element 9 and the subsequent joint 8, the probe head can readily follow angled or greatly variable surface profiles. In principle, however, even further rotational or translational degrees of freedom can be integrated into the guide means in order to enable further improved guidance of the probe head.

The probe head has at least one surface-side emission and reception beam path of the measurement beam MS. In this exemplary embodiment, the beam paths are led through a thin tube as probing element 7, which includes the transmitting/receiving optical unit. In the thicker base part 6 of the probe head adjacent to said tube, it is possible to arrange actually the radiation detector itself or else optical waveguides for relaying to a radiation detector integrated elsewhere, wherein an interface for the optical and/or electrical transfer of signals and a coupling between base part 6 of the probe head and joint 8 ensures exchangeability.

FIG. 3 schematically shows the integration of transmitting/receiving optical unit into the tube of the probe head. In this configuration, a fiber 7a serves for guiding the measurement radiation to be emitted and also the internally reflected measurement radiation and the measurement radiation MS that is externally reflected and received again. In this case, the emission takes place through a gradient-index lens 7b which is arranged in the tubular part and which emits the measurement radiation onto the surface 4 to be measured and couples the measurement radiation MS reflected from there into the fiber 7a again. However, the solutions in the prior art are mainly designed only for individual measurements, wherein surfaces can also be detected continuously by the probe head being guided in a scanning fashion.

Figure 4:
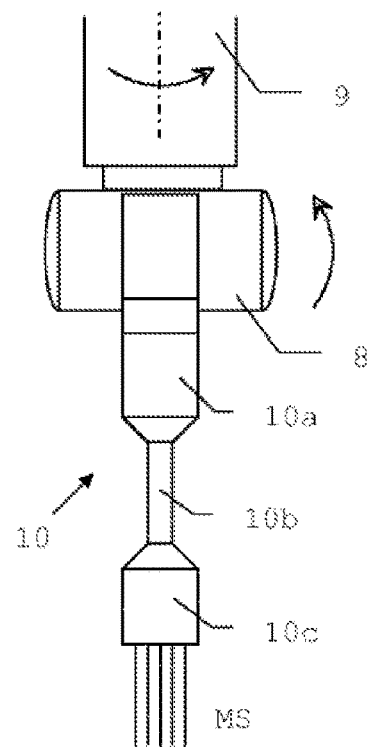
FIG. 4 shows the illustration of the structural construction of a probe head for a distance measuring arrangement according to the invention.

The approach according to the invention, however, allows improved parallelization and the realization of a plurality or multiplicity of measurement channels, such that the structural construction of a probe head as shown in FIG. 4 with a plurality of channels becomes possible in conjunction with simple structural construction.

The probe head 10 comprising a distance measuring arrangement according to the invention now has a base part 10a, in which laser source and evaluation electronics can be arranged. Alternatively, however, these components can also be part of a different component of the measuring apparatus, wherein an optical and/or electronic connection between joint 8 and the base part 10a of the probe head 10 is then provided via one or a plurality of interfaces. Preferably, the base part 10a of the probe head is connected to the optical unit part 10c via a connection tube 10b, wherein the connection tube 10b has an optical guide. Alternatively, however, it is also possible to use arrangements deviating therefrom for realizing the distance measuring arrangement according to the invention. In this regard, for example, it is also possible to concentrate all the components of the probe head 10 in a single, compact unit, such that the connection tube 10b is omitted.

Consequently, the probe head 10 integrates all or the majority of the components of the interferometric distance measuring arrangement according to the invention for measuring surfaces, wherein said arrangement is configured, in particular, according to the principle of optical coherence tomography. For this purpose, the laser source, which is tunable with regard to the wavelength, is modulated for generating measurement radiation MS by virtue of the modulation passing through a linear wavelength ramp or selecting the wavelength in some other, not necessarily linear, succession from a set of different wavelengths. An optical beam path is formed in the probe head 10, wherein a transmitting optical unit for emitting the measurement radiation MS onto the surface and a receiving optical unit for receiving the measurement radiation MS backscattered from the surface are formed in the optical unit part 10c. In this case, transmitting optical unit and receiving optical unit preferably use the same components, such that both optical units are embodied in an integrated design as a combined transmitting and receiving optical unit, which is coupled to the radiation detector via a, in particular a single, monomode fiber. A measurement arm and a reference arm are defined or formed in the beam path in a manner identical to the prior art, wherein this interferometer arm in particular with a partly common beam path of measurement arm and reference arm are configured as a common path interferometer. The radiation detector and an evaluation unit for determining the distance from a reference point of the distance measuring arrangement to the surface can be arranged either in the base part 10a of the probe head or else outside the probe head, wherein in the latter case the probe head dispenses with electronic components and can thus be kept completely passive.

In the base part 10a, the laser radiation can be split by at least one beam splitter, such that said laser radiation is subsequently guided via delay sections and the measurement range predefined by the coherence length of the source is thus divided among the channels. As a result, at least two channels for the parallel emission of measurement radiation MS are defined, which according to the invention are allocated in each case a different zero point in the measurement range. This means that each channel is allocated a different partial measurement range which is used for this channel for measuring. The division of the measurement range into partial measurement ranges need not necessarily be carried out uniformly, i.e. into subranges of identical measurement depth, but rather can also encompass the allocation of different partial measurement ranges. By this means, for example, channels having different measurement characteristics can be realized, e.g. if, in the case of a measurement of drilled holes, channels for measuring the inner surface with a smaller measurement range are designed in parallel with a channel with a larger measurement range for positioning in the longitudinal axis of the drilled hole.

Figure 5:
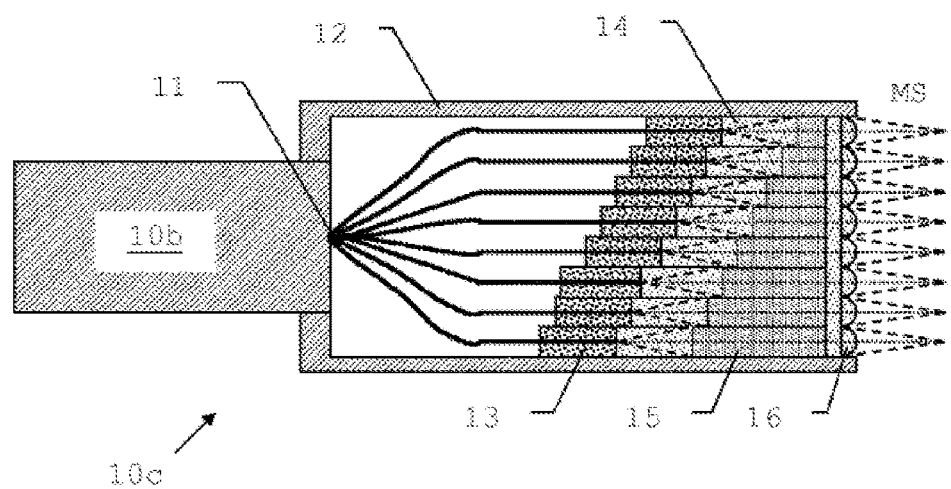
FIG. 5 shows the schematic illustration of a first exemplary embodiment for the optical unit part of a distance measuring arrangement according to the invention.

FIG. 5 shows the schematic illustration of a first exemplary embodiment for the optical unit part of a distance measuring arrangement according to the invention. This optical unit part 10c is connected via the connection tube 10b of the probe head to the base part 10a, in which the optical fibers 11 of the channels which are led from a beam splitter also run. In the housing 12 of the optical unit part 10c, the fibers 11 are coupled via respectively assigned ferrules 13 into gradient-index lenses 14, which function as collimators. In this case, the respective transition from ferrule 13 to gradient-index lens 14 constitutes the back reflecting surface for defining the reference arm using common path geometry. At least for n−1 of the n channels, there is disposed downstream of the gradient-index lens 14 of each channel an individual delay section for the measurement radiation MS, which can be realized in particular by glass elements 15 of different lengths, which are chosen in terms of their lengths such that each of the channels is assigned a different fraction of the maximum measurement range.

The ends of the delay sections 15 are connected to a line or a matrix of microlenses 16, depending on the aperture geometry. On account of the delay section, each channel now has an individual length $\delta L_i$—determined by the respective glass element 15 as delay section—between focal point as target surface and transition ferrule 13 to gradient-index lens 14.

These lengths $\delta L_i$ and the delays brought about thereby allow separation of the channels in the Fourier domain during the signal processing. In this exemplary embodiment, too, an integrated transmitting and receiving optical unit is used, such that the measurement radiation MS reflected back from the surface to be measured is again passed via the microlenses 16 and glass element 15. After passing through them, the detected signals are again combined by a beam splitter and coupled into a single monomode fiber and guided by means of the latter to the radiation detector, which in particular can also be arranged outside the probe head, which is then electronically passive. In this case, losses caused by the beam splitter can be compensated for again by amplifiers connected downstream.

Figure 6:
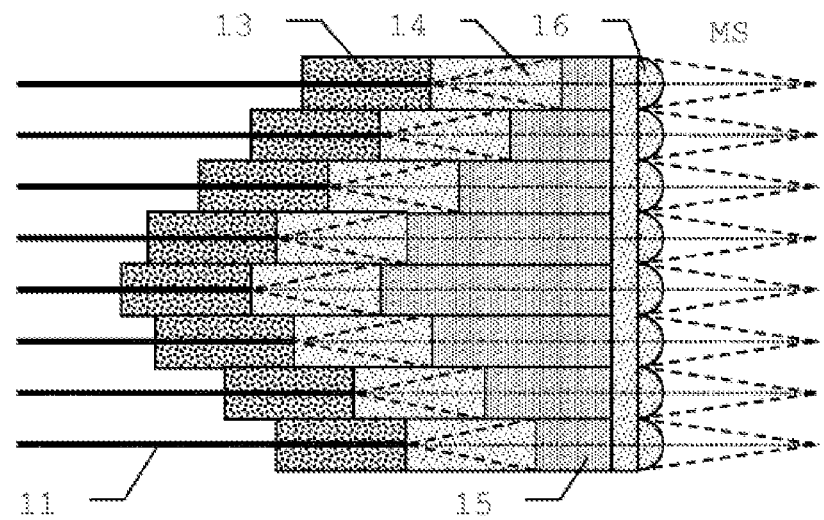
FIG. 6 shows the schematic illustration of a second exemplary embodiment for the optical unit part of a distance measuring arrangement according to the invention.
Figure 7:
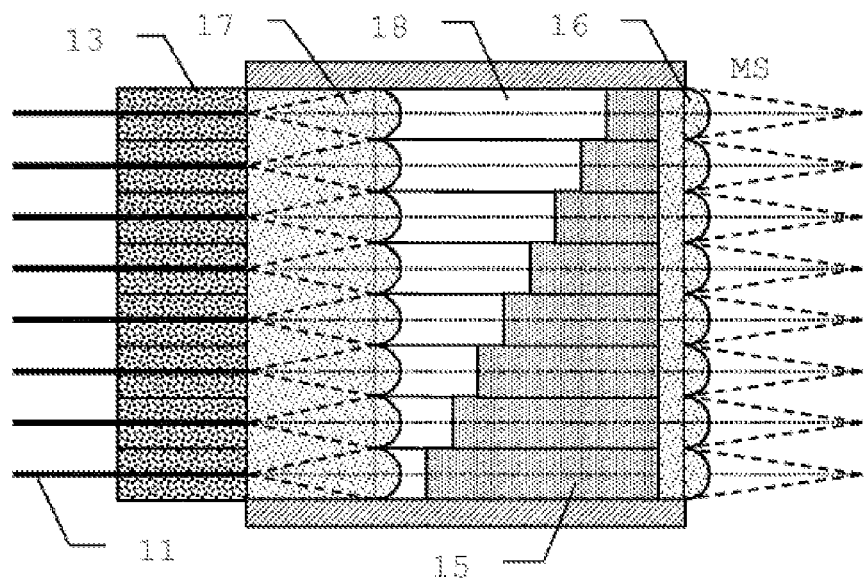
FIG. 7 shows the schematic illustration of a third exemplary embodiment for the optical unit part of a distance measuring arrangement according to the invention.

Alternative exemplary embodiments of a second and third exemplary embodiment for the optical unit part of a distance measuring arrangement according to the invention are shown in FIG. 6 and FIG. 7.

The second exemplary embodiment shown in FIG. 6 uses a different spatial succession of the lengths of the delay sections for the transmitting and receiving optical unit in conjunction with a construction basically identical to FIG. 5. In this exemplary embodiment, the glass elements 15 are not arranged linearly but rather from the outside inward on the basis of their increasing lengths and in addition alternately, such that the shortest glass elements 15 are located on the outside and the longest glass elements 15 are located in the center of the arrangement.

The third alternative exemplary embodiment for the transmitting and receiving optical unit as shown in FIG. 7 uses two separate glass substrates as carriers of the optical components, wherein a free interspace 18 filled with air is situated between the microlenses 16 used for the emission of the measurement radiation MS and the glass elements 15, on the one hand, and the ferrules 13 with a downstream line or matrix composed of collimating micro-optical units 17, on the other hand.

Figure 8:
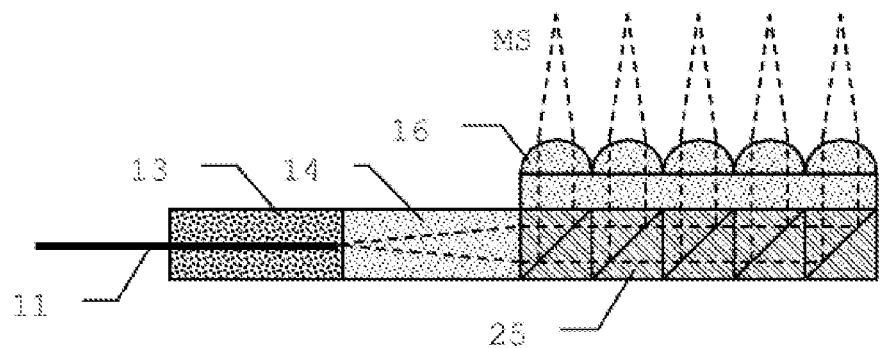
FIG. 8 shows the schematic illustration of a fourth exemplary embodiment for the optical unit part of a distance measuring arrangement according to the invention.

The fourth alternative exemplary embodiment for the transmitting and receiving optical unit as shown in FIG. 8 uses a sequence of non-chromatic beam splitters 25 having an increasing reflectivity of the beam splitter coating as viewed from the gradient-index lens 14, such as e.g. the sequence 20%, 25%, 33%, 50% and 100%. The measurement radiation MS emerging in each case at one of the non-chromatic beam splitters 25 is focused individually in each case by means of a microlens line 16.

Figure 9:
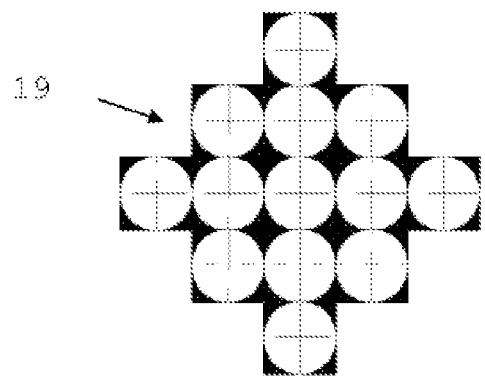
FIG. 9 shows the schematic illustration of the aperture arrangement of a transmitting and receiving optical unit for a distance measuring arrangement according to the invention.

As an alternative to the line-like manner of arrangement illustrated in FIG. 7, however, it is also possible to use a matrix-like aperture arrangement 19 of a transmitting and receiving optical unit for a distance measuring arrangement according to the invention, such as is illustrated schematically in FIG. 9. With such two-dimensional microlens or aperture arrangements, areally extensive structures, in particular, can be measured rapidly and in a parallelized fashion.

Figure 10:
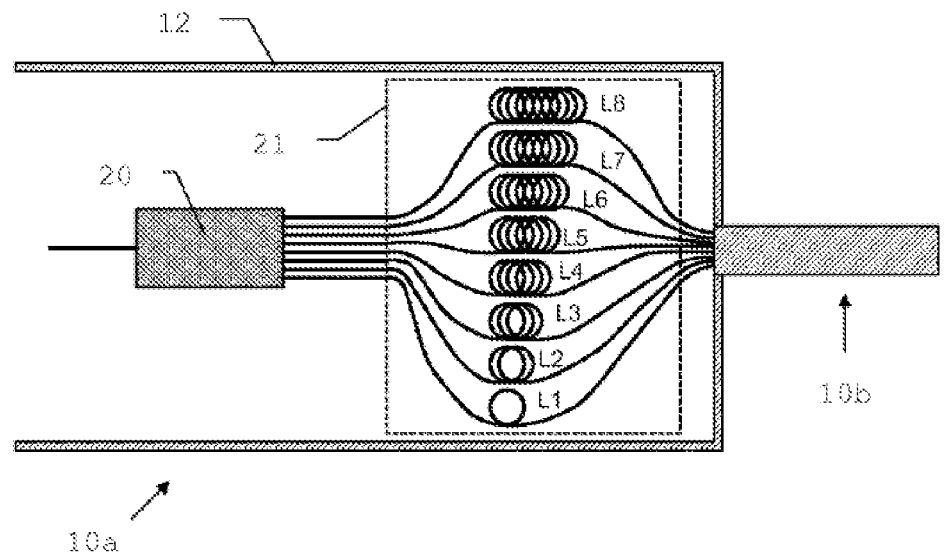
FIG. 10 shows the schematic illustration of a first exemplary embodiment for the base part of a distance measuring arrangement according to the invention.

FIG. 10 illustrates the construction of a first exemplary embodiment for the base part 10a of a distance measuring arrangement according to the invention. In the housing 12, a beam splitter 20, which can be embodied as a 1×n splitter, which can be embodied for example as a 2×2 fused fiber coupler, thin-film filter or planar lightwave circuit, brings about a division of the laser radiation into the n different channels which are guided via a coherence delay unit 21. These channels have for this purpose in each case an assigned coherence delay section for avoiding crosstalk between the channels, which can be embodied in particular as optical fibers L1-L8. The relative length spacing $\Delta L_i$ from channel $L_i$ to channel $L_{i+1}$ here is in each case greater than the coherence length $L_{coh}$ of the laser source $$\Delta L_i = L_{i+1} - L_i > \frac{L_{coh}}{2}$$

These coherence delay sections serve here merely for avoiding crosstalk, and so they can be dispensed with under certain circumstances, for example given a sufficiently large spacing of the channels. By contrast, the division of the total measurement range into subranges is brought about by the delay sections or the section differences brought about thereby in the optical unit part 10c shown in FIGS. 5-7.

Figure 11:
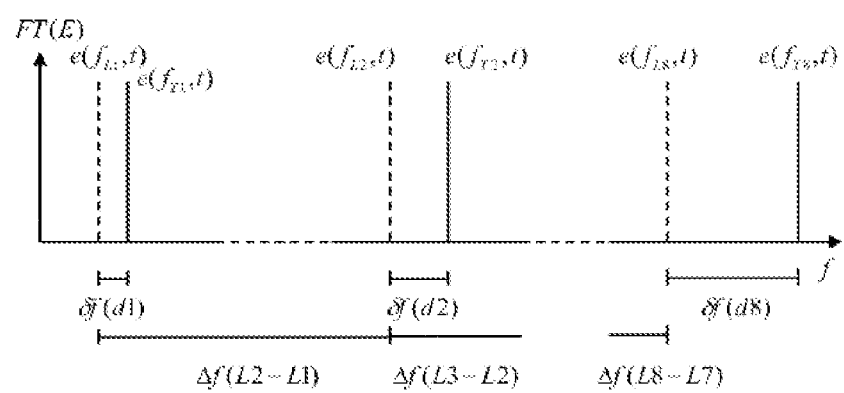
FIG. 11 shows the schematic illustration of the distribution of the E-fields in the frequency domain.

FIG. 11 illustrates the distribution of the E-fields or the Fourier transforms FT(E) thereof in the frequency domain for the first exemplary embodiment for the base part 10a of a distance measuring arrangement according to the invention with its coherence delay unit. At an instant t the frequency spectrum consists of contributions of different electromagnetic fields, wherein each channel i has a signal of the local oscillator $e(f_{Li},t)$ and a signal of the target or of the target surface $e(f_{Ti},t)$. The channels here are spaced apart in the frequency domain in each case as follows $$\Delta f_{ch\_i} = \frac{2\Delta L_i \cdot \gamma}{c}$$

wherein c denotes the speed of light and γ denotes the tuning rate of the modulation of the laser source, e.g. 20 THz/ms.

Besides the large spacings $\Delta f_{ch\_i}$ of the channels with respect to one another, each channel splits into the two signal components of the local oscillator LO, i.e. of the reference arm, and of the target, i.e. of the measurement arm, with the spacing $$\delta f_{ch\_i} = \frac{2\delta L_i \cdot \gamma}{c}, \text{ where } \delta L_i = L_{target\_i} - L_{LO\_i}$$

wherein $L_{LO\_i}$ and $L_{target\_i}$ denote the respective lengths of reference arm and measurement arm, and so the difference $\delta L_i$ between them corresponds to the sought distance to the surface. The determination of these sought distances to the surface to be measured is known, in principle, from the prior art as described for example in WO 2009/036861 or the European patent application having the application number 11171582.7.

Figure 12:
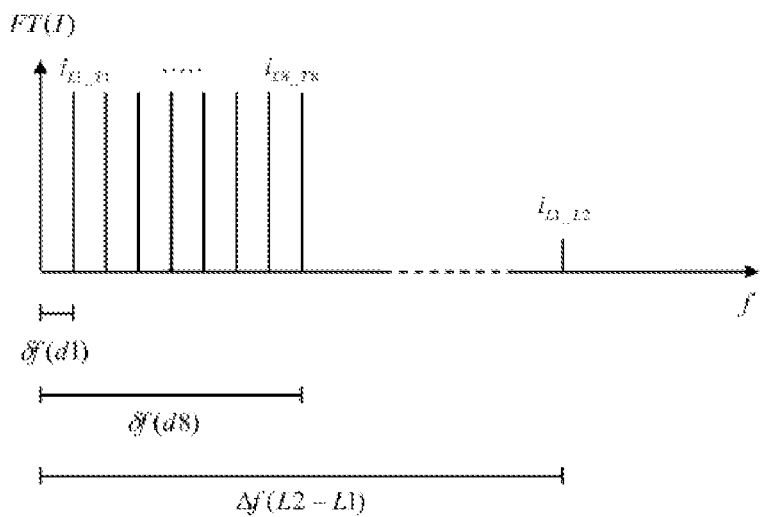
FIG. 12 shows the schematic illustration of the distribution of the detected intensities from a plurality of interferograms in the frequency domain.

FIG. 12 shows the corresponding schematic illustration of the distribution—consisting of a plurality of interferograms—of the detected intensities or the Fourier transforms FT(I) thereof in the frequency domain. The peaks in the Fourier spectrum can be separated by bandpass filtering in the signal processing and evaluated separately.

Figure 13:
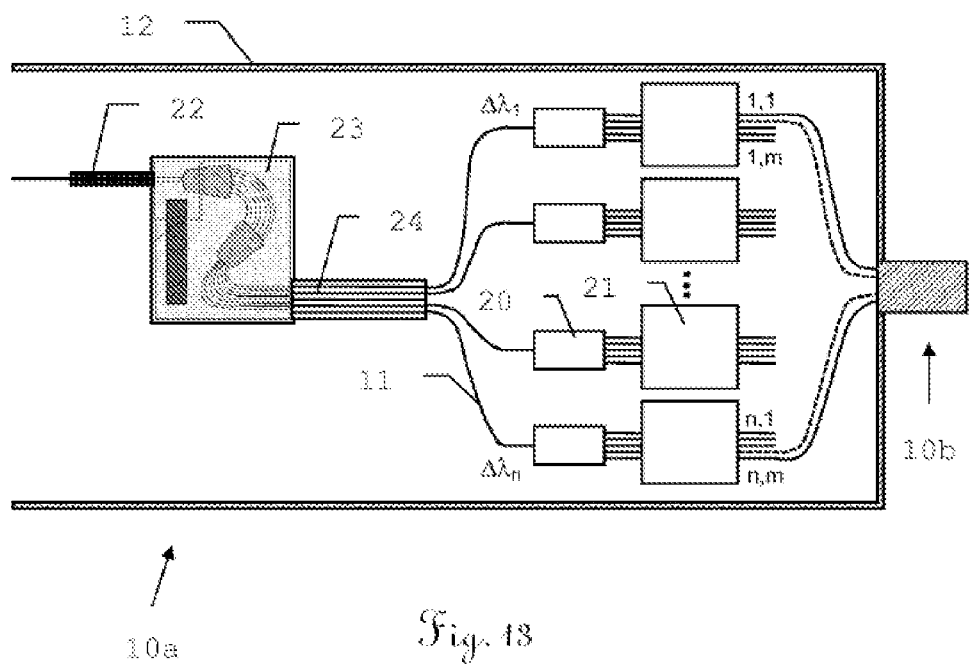
FIG. 13 shows the schematic illustration of a second exemplary embodiment for the base part of the distance measuring arrangement according to the invention.

The approach of frequency division multiplexing with a use of delay sections can also be combined with the approach of chromatic division of the channels, as is illustrated schematically in FIG. 13 for a second exemplary embodiment for the base part of the distance measuring arrangement according to the invention. In this case, both approaches are realized simultaneously and combined with one another in the base part 10a of the probe head.

In the housing 12 of the base part 10a, an arrayed waveguide grating as chromatic beam splitter 23 is disposed downstream of the monomode fiber with ferrule 22. Such an arrayed waveguide grating can produce chromatic multiplexing by subdividing the tuning range or the wavelength ramp into different branches or subranges, such that the wavelength ramp is split into a number of wavelength bands of identical width, which number corresponds to the number of channels, which corresponds to chromatic separation. For a tuning range of between 1500 and 1600 nm, it is possible to use components from the field of telecommunications for the c and l bands. In this regard, arrayed waveguide gratings are used in this area in order to divide a channel into different separate so-called ITU channels. In this case, the width of the channels depends on the ITU standard used, said width ranging from 50, 100 or 200 GHz to a few nanometers. Such a chromatic beam splitter 23 makes it possible to realize a chromatic or spectral splitting of the laser radiation into different channels, in particular a multiplicity of channels, wherein the arrayed waveguide grating shown here as chromatic beam splitter 23 by way of example acts like a compact spectrometer. At the output of the chromatic beam splitter 23, the measurement radiation divided into channels is coupled via a multi-fiber ferrule 24 into individual optical fibers 11, each of which is assigned one of the frequency or wavelength ranges $\Delta\lambda_1$-$\Delta\lambda_n$. The fibers 11 for their part are guided in each case to a non-chromatic 1×m beam splitter 20, such as is also used in FIG. 10 or the first exemplary embodiment for the base part of a distance measuring arrangement according to the invention. Downstream of each of the beam splitters 20 there is disposed in turn a coherence delay unit 21, whose outputs indexed from 1,1 to n,m are combined to form a fiber bundle and guided to the optical unit part via the connection tube 10b in a manner identical to the other exemplary embodiments. The optical unit part can in turn be configured in accordance with the exemplary embodiments in FIGS. 5-7. The succession of chromatic beam splitting with downstream coherence delay unit as shown in this example is not mandatory and can also be reversed in particular in its order.

Figure 14:
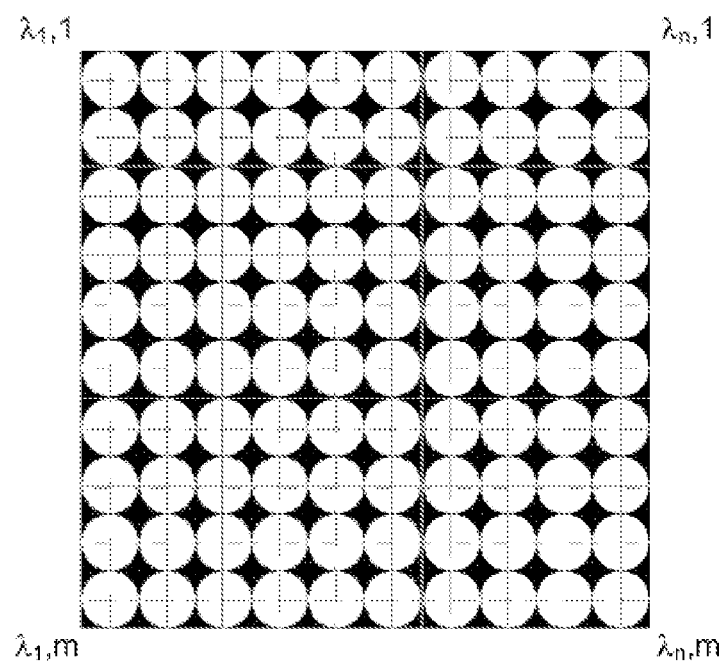
FIG. 14 shows the schematic illustration of an aperture arrangement of a transmitting and receiving optical unit for the second exemplary embodiment for the base part of the distance measuring arrangement according to the invention.

The apertures of the different channels for the second exemplary embodiment for the base part can be arranged in a matrix-like fashion in particular in the succession shown in FIG. 14, wherein the allocation of a chromatic range that is different column by column is carried out, which is superimposed by a delay that varies line by line, such that each individual channel is configured as separable by virtue of its dedicated combination of wavelength range and delay and the received signal is thereby assignable.

What is claimed is:

1. An interferometric distance measuring arrangement for measuring surfaces according to optical coherence tomography, comprising:
   a tunable laser source having a coherence length for generating measurement radiation modulated with a wavelength ramp, wherein the coherence length of the laser source defines the measurement range;
   an interferometer comprising a measurement arm and a reference arm structurally comprised of transmitting and receiving optics designed to emit the measurement radiation onto a surface and to receive the measurement radiation backscattered from the surface and
   a radiation detector and an evaluation electronics designed to determine interferometrically the distance from a reference point of the distance measuring arrangement to the surface, wherein:
   the transmitting and receiving optics are further comprised of at least one beam splitter, being arranged in the optical beam path such that it brings about a division of the measurement radiation, and n≥2 fiber optic channels for the simultaneous emission of measurement radiation, whereby each of the fiber optic channels causes a different subrange of the measurement range to have a different coherence length and each fiber optic channel is allocated a different subrange of the measurement range defined by the coherence length, wherein the fiber optic channels are arranged in the transmitting optics in a line- or matrix-like fashion.

2. The distance measuring arrangement as claimed in claim 1, wherein:
   each of the fiber optic channels is allocated a different subrange of the measurement range defined by the coherence length whereby all subranges have identical measurement depth.

3. The distance measuring arrangement as claimed in claim 1, wherein:
   at least n-1 fiber optic channels in each case have a delaying division section.

4. The distance measuring arrangement as claimed in claim 1, wherein:
   at least n-1 fiber optic channels in each case includes glass elements of different lengths.

5. The distance measuring arrangement as claimed in claim 1, wherein:
   the fiber optic channels for the parallel emission of measurement radiation (MS) are defined by a sequence of at least n-1 beam splitters for coupling of the fiber optic channels, wherein the beam splitters have an increasing reflectivity of their beam splitter coating in the sequence.

6. The distance measuring arrangement as claimed in claim 1, wherein:
   at least n-1 fiber optic channel or channels in each case have a coherence delay section for avoiding crosstalk whose relative length spacing from fiber optic channel to fiber optic channel is in each case greater than the coherence length.

7. The distance measuring arrangement as claimed in claim 1, wherein:
the transmitting and receiving optics are embodied as a combined transmitting and receiving optics which is coupled to the radiation detector via a single, monomode fiber.

8. The distance measuring arrangement as claimed in claim 1,
wherein: the beam splitter is a 2×2 fused fiber coupler, thin-film filter or planar lightwave circuit.

9. The distance measuring arrangement as claimed in claim 1, wherein:
the fiber optic channels are allocated different subranges of the wavelength ramp.

10. The distance measuring arrangement as claimed in claim 9, wherein:
the wavelength ramp is split into wavelength bands of identical width by the beam splitter.

11. The distance measuring arrangement as claimed in claim 9, wherein:
the subranges of the wavelength ramp are generated by chromatic separation.

12. The distance measuring arrangement as claimed in claim 9, wherein:
the subranges of the wavelength ramp are generated by chromatic separation by a chromatic beam splitter.

13. The distance measuring arrangement as claimed in claim 1, wherein:
the interferometer includes a partly common beam path of measurement arm and reference arm.

14. An interferometric distance measuring method for measuring surfaces according to the principle of optical coherence tomography, the method comprising:
generating measurement radiation modulated with a wavelength ramp by means of a laser source having a coherence length, wherein the coherence length of the laser source defines the measurement range,
emitting the measurement radiation onto a surface,
receiving the measurement radiation backscattered from the surface
determining interferometrically the distance from a reference point of a distance measuring arrangement to the surface, wherein:
the measurement radiation is guided in parallel via n≥2 fiber optic channels for the simultaneous emission of measurement radiation, whereby each of the fiber optic channels causes a different subrange of the measurement range to have a different coherence length and each fiber optic channel is allocated a different subrange of the measurement range defined by the coherence length, wherein the channels are arranged in the transmitting optics in a line- or matrix-like fashion.

15. The distance measuring method as claimed in claim 14, wherein:
the measurement range defined by the coherence length is split into subranges of identical measurement depth.

16. The distance measuring method as claimed in claim 14, wherein:
the measurement radiation is delayed in at least n-1 fiber optic channel or channels in each case such that each of the channels is assigned a different subrange.

17. The distance measuring method as claimed in claim 14, wherein:
the measurement radiation is delayed in at least n-1 fiber optic channel or channels for avoiding crosstalk in each case such that the relative length spacing corresponding to the delay from fiber optic channel to fiber optic channel is in each case greater than the coherence length of the laser source.

18. The distance measuring method as claimed in claim 14, wherein:
the fiber optic channels are allocated different subranges of the wavelength ramp for a given emission instant.

19. The distance measuring method as claimed in claim 14, wherein:
the wavelength ramp is split into wavelength bands of identical width.

20. The distance measuring method as claimed in claim 14, wherein:
the subranges of the wavelength ramp are generated by chromatic separation.

* * * * *